(12) United States Patent
Cieslak, Jr.

(10) Patent No.: US 6,445,078 B1
(45) Date of Patent: Sep. 3, 2002

(54) GRAVITY ELECTRICAL GENERATING SYSTEM

(76) Inventor: Stanley Cieslak, Jr., 102 Creek Rd., McKees Rocks, PA (US) 15136

( * ) Notice: Subject to any disclaimer, the term of this patent is extended or adjusted under 35 U.S.C. 154(b) by 0 days.

(21) Appl. No.: 09/916,874

(22) Filed: Jul. 30, 2001

(51) Int. Cl.[7] .............................. F03B 13/06; F03S 5/00
(52) U.S. Cl. ........................................ 290/1 R; 290/54
(58) Field of Search .............................. 290/53, 43, 54; F03B 13/12, 11/02, 13/08, 13/06

(56) References Cited

U.S. PATENT DOCUMENTS

| | | | | |
|---|---|---|---|---|
| 3,790,214 A | | 2/1974 | Kilroy | 299/8 |
| 3,838,886 A | * | 10/1974 | Kilroy | 299/18 |
| 4,132,901 A | * | 1/1979 | Crausbay | 290/42 |
| 4,284,899 A | * | 8/1981 | Bendiks | 290/1 R |
| 4,443,707 A | * | 4/1984 | Scieri et al. | 290/4 A |
| 4,514,977 A | | 5/1985 | Bowen | 60/398 |
| 5,905,312 A | * | 5/1999 | Liou | 290/54 |

FOREIGN PATENT DOCUMENTS

GB          348603     5/1931

\* cited by examiner

Primary Examiner—Joseph Waks
Assistant Examiner—Karen Addison
(74) Attorney, Agent, or Firm—Carothers & Carothers

(57) ABSTRACT

A system for gravity generation of electricity which includes upper and lower water reservoirs with a conduit between the reservoirs and a pump to continuously pump water from the lower reservoir to the upper reservoir. A number of water containers are positioned side-by-side and mounted for up and down travel between the upper and lower reservoirs. When the containers have attained their upper most position at the upper reservoir, they are engaged by limit switch mechanisms to fill the containers with water from the upper reservoir. Upon being filled the containers travel by gravity to their lower most position to the lower reservoir wherein additional limit switch mechanisms are employed to drain the containers into the bottom reservoir. As the containers travel downwardly, they engage and drive an electric generator for generating large quantities of electricity. Once the containers are at their lower most position and have been fully drained they are driven back up to the upper reservoir for refill by independent geared motors.

2 Claims, 2 Drawing Sheets

GRAVITY ELECTRICAL GENERATING SYSTEM

FIELD OF THE INVENTION

The present invention relates to a system for generating electricity, and more particularly to a system for generating electricity by gravity.

BACKGROUND OF THE INVENTION

Conventional methods for generating electricity include hydro power, fossil fuel, nuclear power, wind power and gravity systems which utilize water which is re-circulated to operate a water wheel type driven electrical generator. An example of this latter type of gravity generating system is illustrated in U.S. Pat. No. 5,905,312.

Hydro power is not always available, nor is wind power available in many locations and these locations generally must rely on fossil fuel or nuclear plants which generate pollution of one form or another.

The gravity electrical generating system of the present invention has the advantage of providing electrical generation systems in those locations wherein fossil fuel or nuclear plants would normally be installed, and has the further advantage of providing electrical generation more efficiently than the gravity generating system described in U.S. Pat. No. 5,905,312.

SUMMARY OF THE INVENTION

The gravity electrical generating system of the present invention includes an upper water reservoir, a lower water reservoir and a conduit connecting these reservoirs whereby a pump is connected for pumping water from the lower reservoir to the upper reservoir through the conduit.

A plurality (most preferably three or more) of containers are positioned side-by-side and mounted for up and down travel between the upper and lower reservoirs. For example, these side-by-side containers may be mounted with a guide mechanism for guiding their up and down travel between the upper most and lower most positions between upper and lower reservoirs. This guide mechanism could be, for example, a rail system which rides up and down a large incline or mountain side.

A filler mechanism is provided at the upper reservoir for filling the containers when the containers are at the upper most position adjacent the upper reservoir, and drains are provided for draining water from the containers into the lower reservoir when the containers reach or attain the lower most position adjacent the lower reservoir at the bottom of the incline. After the containers have fully drained and are therefore empty and lightweight, an electric motor drives the containers back up to the upper most position to be refilled at the upper reservoir. A limit switch mechanism is provided for retaining and filling the containers with water from the upper reservoir and when each container is full, it is released for guided downward movement by gravity travel toward the bottom reservoir. During this period in which the full containers are traveling downward under the influence of gravity, the containers are respectively in driving engagement with an electric generator for driving the electric generator to generate electricity. The containers are preferably coordinated so that they travel downwardly under their full load at different time periods in order to maintain the electric generator in continuous operation.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

DETAILED DESCRIPTION OF A PREFERRED EMBODIMENT

Figure 1:
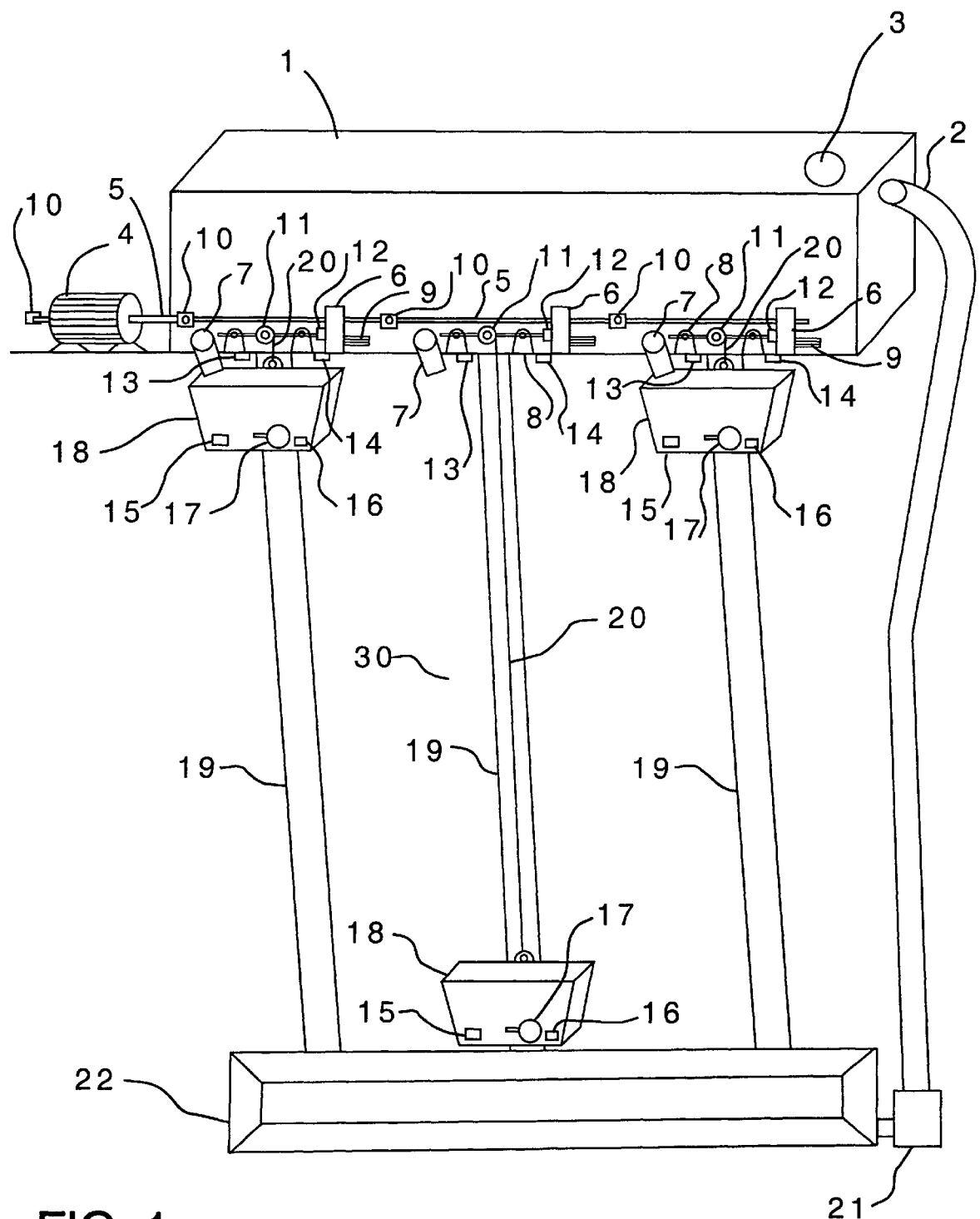
FIG. 1 is a schematic drawing illustrating the gravity electrical generating system of the present invention in front elevation.
Figure 2:
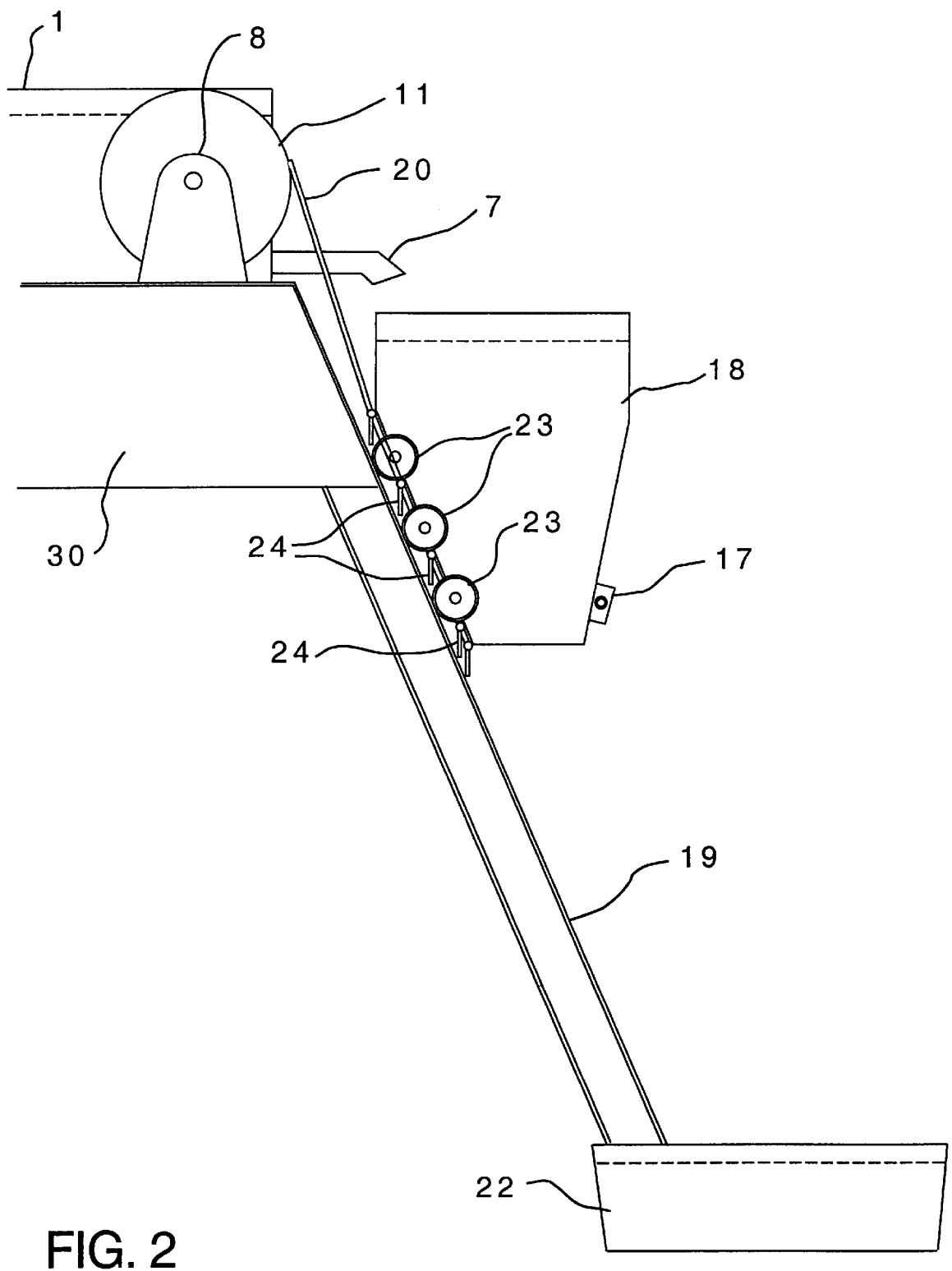
FIG. 2 is a schematic drawing in left side elevation of the system shown in FIG. 1.

Referring to the drawings, the gravity system of the present invention for generating electricity is illustrated. An upper water reservoir 1 is provided as well as a lower water reservoir 22 and a conduit 2 is further provided which connects the two reservoirs. A pump 21 is connected to conduit 2 for pumping water from the lower reservoir 22 to upper reservoir 1.

Three containers 18 are positioned side-by-side and mounted for up and down travel between upper and lower reservoirs 1 and 22 respectively on tracks or rails 19 which are provided on an incline, such as a mountain side 30. By way of example, the vertical distance between upper and lower reservoirs 1 and 22 might be 200 to 300 feet.

A filler mechanism for filling the containers 18 with water from upper reservoir 1 is provided when the containers are at an upper most position adjacent the upper reservoir 1, as is indicated by the left and right containers 18 in FIG. 1, with the middle container being at the lower most position adjacent reservoir 22. This filler mechanism includes filler valves 7, the limit switch 13, which disconnects the drive for returning the containers to their upper most position and locks a brake 12 and opens the fill valve 7 to fill the container 18. The filler mechanism further includes a timer switch 14 that engages the gear box 6 to drive the pulley 11 and to close the fill valve 7 and release the brake.

When the brake 12 is released the filled container 18 then travels downwardly under the force of gravity on tracks or rails 19 and thereby pulls downwardly on cable 20 which rotates pulley 11. This in turn rotates the shaft retained in bearing pillar blocks 8 which thereby transmits rotational forces to the gear box 6 which in turn rotates drive shaft 5. Drive shaft 31 is made up of shaft segments, one for each container and these segments are rotatably connected together by one-way couplers 10. The rotation of shaft 5 is ultimately transmitted to electric generator 4 to generate electricity for public use.

When each container reaches its lower most position at the lower reservoir 22 as indicated in FIG. 1 by the position of the center container 18, limit switch 15 is engaged and disconnects the drive gear and pulley 11 and opens the dump valve 17 to empty the contents of container 18 into lower reservoir 22. Once the container 18 is fully drained, limit switch 16 causes the dump valve 17 to close and engages the geared return motor 9 to drive the empty containers 18 from their lower most position adjacent lower reservoir 22 up to their upper most position immediately adjacent under upper reservoir 1 for refilling. A return water pump 21 continuously pumps the water (or other fluid) from bottom reservoir 22 upwardly through conduit 2 for re-circulation back into the system into upper reservoir 1. Upper reservoir 1 is provided with an air vent 3 to prevent an air lock in the system.

The containers 18 run on track or rails 19 via carriage wheels 23 and safety locks 24 are provided in case the cable 20 should break or something else malfunctions whereby the locks 24 drop in and stop the container 18 from moving further.

I claim:

1. A system for generating electricity by gravity comprising:

an upper water reservoir;

a lower water reservoir;

a conduit connecting said reservoirs;

a pump connected to said conduit for pumping water from said lower reservoir to said upper reservoir;

an electric generator for generating electricity;

a plurality of containers positioned side-by-side and mounted for up and down travel between said upper and lower reservoirs;

filler means for filing said containers with water from said upper reservoir when said containers are at an upper-most position adjacent said upper reservoir;

drain means for draining water from said containers into said lower reservoir when said containers are at a lower-most position adjacent said lower reservoir;

guide means for guiding the up and down travel of said containers between said upper-most and lower-most positions;

motor means connected for driving said drained containers from said lower-most position to said upper-most position;

upper limit switch means for retaining and filling said containers with water from said upper reservoir when said containers attain said upper-most position and for releasing said containers when filled for downwardly guided gravity travel;

lower limit switch means for retaining and draining said containers into said lower reservoir when said containers attain said lower-most position and for releasing said drained containers and energizing said motor means for upwardly travel of said containers when drained; and said containers connected in driving engagement with said electric generator when said filled containers are traveling downward for driving said electrical generator to generate electricity.

2. A method of generating electricity comprising;

providing a plurality of containers in side-by-side relationship for guided up and down travel between upper and lower water reservoirs;

filling said containers with water from said upper reservoir when said containers attain an upper most position;

permitting the filled containers to travel downwardly to said lower reservoir by gravity and thereby energizing an electrical generator with the energy produced by the downwardly traveling container for generating electricity;

draining said filled containers into said lower reservoir when the containers attain said lower reservoir; and driving the drained containers back up to the upper reservoir for refilling.

\* \* \* \* \*